Patented Mar. 23, 1937

2,074,786

UNITED STATES PATENT OFFICE 2,074,786

SYNTHETIC RESIN

George De Witt Graves, Wilmington, Del., assignor to E. I. du Pont de Nemours & Company, Wilmington, Del., a corporation of Delaware No Drawing. Application May 19, 1936, Serial No. 80,635

6 Claims. (Cl. 260—3)

This invention relates to new synthetic resins and more particularly to ketone-aldehyde resins.

This invention has as its object the production of new synthetic resins. A further object is the production of synthetic resins from certain polynuclear hydroaromatic polyketones and an aldehyde, particularly formaldehyde. Further objects will appear hereinafter.

These objects are accomplished by heating an aldehyde, particularly formaldehyde, with a polynuclear polyketone in which the carbon atom of each ketone group is a part of a hydroaromatic ring and is attached to at least one methylene group, in the presence of a suitable condensing agent such as caustic potash or other alkaline catalyst and in the presence or absence of a suitable reaction medium or solvent, until the desired degree of resinification is obtained, and then isolating the resinous reaction product.

In the preferred procedure for carrying out my invention the polynuclear hydroaromatic polyketone is mixed with the aldehyde with vigorous stirring, either in the presence or absence of a solvent or reaction medium, and a small proportion of an alkaline condensing agent such as potassium hydroxide is added. The mixture is then heated at the desired temperature, with or without agitation, until reaction is completed and a resinous product is obtained either in the solid form or as a viscous solution in the solvent which may have been used. The resinous mass is precipitated by pouring the reaction mixture into water, or it may be obtained by evaporating off the solvent. It may then be washed with water and dried.

The method for carrying out my invention is illustrated more in detail by the procedure of the following example which is applicable generally to the manufacture of my new compounds from the ketones disclosed herein. Parts given are by weight.

Example

Twenty-four and four-tenths parts (0.1 mol.) of 2,2-bis(3-methyl-4-keto-cyclohexyl) propane and 39.3 parts (0.48 mol.) of 37% aqueous formaldehyde were dissolved in 50 parts of ethanol with vigorous stirring, and to the solution was added one part of potassium hydroxide dissolved in 10 parts of ethanol. The resulting clear solution was heated at approximately 72° C. for 48 hours. The still clear solution was then poured into a relatively large volume of water at room temperature. The soft resinous mass which separated out was washed thoroughly with water at room temperature and dried in vacuo at about 80° C. The product was a colorless, brittle resin which softened somewhat at 90° C. The resin was soluble in alcohols, toluene-alcohol mixtures, $\beta$-methoxyethanol, and drying oils, and was compatible with cellulose acetate and nitrocellulose. It was insoluble in cold butyl acetate and toluene.

The ketones used in making the compounds described herein, as previously mentioned, are polynuclear polyketones in which each ketone carbonyl group is a part of a hydroaromatic ring and is attached to at least one methylene group. The nuclei may be condensed, as in ketonaphthanes, e. g.,

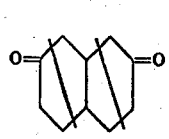 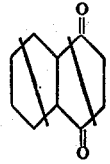

2,8-diketonaphthane    1,4-diketonaphthane or they may be non-condensed, as in compounds in which ketohydroaromatic groups are attached to alkyl groups, e. g.,

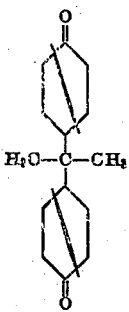 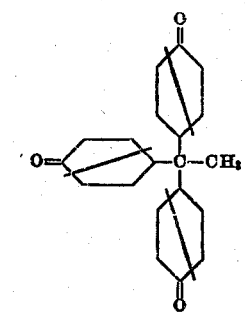

Bis(4-ketocyclohexyl)-    Tri(4-ketocyclohexyl)-
dimethylmethane           methylmethane Although it is feasible to use compounds having more than one ketone group in each carbocyclic nucleus, I prefer to use diketones having but one ketone group in each nucleus. By "carbocyclic nucleus" I mean a single ring such as cyclohexyl or one of the condensed rings present in the naphthane structure. The latter compound is considered to have two carbocyclic nuclei. The term "hydroaromatic" as used herein refers to both partially and completely hydrogenated aromatic rings.

The following are further examples of diketones which may replace the one mentioned in the example:

Bis(3-methyl-4-ketocyclohexyl) ethane
Bis(3-methyl-4-ketocyclohexyl) methane
Bis(3-methyl-4-ketocyclohexyl) cyclohexane
2,2-bis(4-keto-cyclohexyl) propane
4,4'-diketodicyclohexyl
2,2'-diketodicyclohexyl
2,2'-diketodinaphthanyl This invention, however, is not limited to diketones. Triketones and even tetra-ketones may be used provided the carbon atom of each ketone group is a part of a hydroaromatic ring and is attached to at least one methylene group. Examples of hydroaromatic triketones which may be condensed with aldehydes in this invention are:

Tri(4-ketocyclohexyl) methane
Tri(4-keto-3-methyl-cyclohexyl) methane
Tri(2-keto-cyclohexyl) methane
Tri(4-keto-cyclohexyl) methylmethane
Tri(2-ketonaphthanyl) methane In the above examples of triketones, each carbocyclic nucleus contains only one keto group, but it is to be understood that a carbocyclic nucleus might contain two or more keto groups. Thus, a triketone might contain two keto groups in one carbocyclic nucleus, and only one in another. The corresponding tetra-ketones may also be condensed with formaldehyde or other aldehydes.

Polyketones of the kind used in the practice of this invention may be prepared by hydrogenating the corresponding phenols according to methods well known to those skilled in the art, and then dehydrogenating the resulting secondary alcohols by bringing them into contact with a dehydrogenating catalyst such as copper chromite and heating at temperatures of from 50° C. to 400° C., at pressures sufficient to prevent vaporization of the material under treatment, until hydrogen is evolved in the theoretical quantity or ceases to be evolved altogether. A more detailed description of this method is given in application Serial Number 56,084, filed December 24, 1935 by W. A. Lazier and B. W. Howk.

The resins disclosed herein may be modified by adding other resin-forming materials to the above mentioned ketones, and then reacting the mixture with formaldehyde. Examples of such modifying materials are urea, phenols, and simple ketones such as acetone and cyclohexanone which react with formaldehyde in the reaction mixture to produce urea-formaldehyde, phenol-formaldehyde, or ketone-formaldehyde resins.

The reaction for making my new resins may be carried out in the absence of a reaction medium other than the water present in aqueous formaldehyde, or it may be carried out in the absence of any inert medium whatever, provided the polyketone used is a mobile liquid at the desired reaction temperature so that the aldehyde, such as paraformaldehyde, can be incorporated into it directly by stirring, etc. It is also feasible to react the polyketones with liquid aldehydes such as acetaldehyde in the absence of any other reaction medium. It is convenient in some cases to carry out the reaction in the presence of drying oils as the reaction medium.

Monomeric polymerizable materials may also be added to the reaction mixture and allowed to polymerize in the presence of the polycyclic polyketone-formaldehyde resin being formed simultaneously, a suitable polymerization catalyst for these polymerizable materials being added to the reaction mixture if desired. Examples of such polymerizable materials are vinyl acetate; methacrylyl urea; esters, amides, nitriles, etc., of acrylic, methacrylic, itaconic, and fumaric acids; and ketones such as methyl vinyl ketone and methyl isopropenyl ketone.

Various aldehydes such as acetaldehyde or furfural may be used in the practice of this invention. The most satisfactory results, however, are obtained with various forms of formaldehyde or substances which yield it, such as aqueous formaldehyde, paraformaldehyde, methylene chloride, and hexamethylenetetramine. A large excess of aldehyde may make the resins somewhat water sensitive, but rather wide variations in proportions are not in general significant. Usually the minimum desirable amount is about one mol. of aldehyde for each mol. of polyketone.

The reaction medium is preferably ethanol although I may use similar saturated aliphatic alcohols having up to 5 or 6 carbon atoms and mixtures of such alcohols with aromatic hydrocarbons.

In order to expedite the reaction between the ketone and aldehyde it is necessary to heat the reaction mixture, and it is usually convenient to use temperatures in excess of 65° C. and not substantially over 100° C.

The condensing agent is preferably potassium hydroxide but other alkaline catalysts such as caustic soda, calcium hydroxide or ammonia may be used. Strong acid catalysts such as sulfuric and hydrochloric may also be used. The concentration of catalyst can be varied over considerable limits, depending upon the type used, etc. It is generally convenient to employ from 0.5–5% of catalyst based upon the weight of the polyketone.

The resins of this invention are useful wherever resins are needed. For example, they may be useful as ingredients of oil-type coating compositions such as varnishes, enamels, paints, air-drying or baking primers or undercoats for any rigid surface such as steel. They may also be useful as modifying agents for films, sheets, or filaments of cellulose derivatives such as cellulose acetate, cellulose nitrate and other cellulose esters, ethyl cellulose and benzyl cellulose. They are further useful in the coating, sizing, impregnating and molding arts. For the foregoing purposes the resins may be used alone or in conjunction with various natural or synthetic resins and with waxes, plasticizers, pigments and dyes.

The resins of the present invention are particularly advantageous for the reason that they are readily compatible with cellulose acetate (specifically in such ratios as one and two parts acetate for each part of resin), a property not shared by the closest known resins such as the cyclohexanone-formaldehyde resins and naphthanone-formaldehyde resins, which are incompatible with cellulose acetate in all proportions. My new resins are also more compatible with cellulose derivatives in general, as well as with drying oils and other resins, than are the phenol-formaldehyde and many other resins.

As many apparently widely different embodiments of this invention may be made without departing from the spirit and scope thereof, it is to be understood that I do not limit myself to the specific embodiments thereof except as defined in the appended claims.

I claim:
1. The resinous reaction product of an alde- hyde and a polynuclear polyketone in which the carbon atom of each ketone group is a part of a hydroaromatic ring and is attached to at least one methylene group.

2. The resinous reaction product of formaldehyde and a polynuclear polyketone in which the carbon atom of each ketone group is a part of a hydroaromatic ring and is attached to at least one methylene group.

3. The resinous reaction product set forth in claim 2 in which the polyketone is a diketone having the ketone groups in the rings of different nuclei.

4. A process which comprises reacting with heat treatment an aldehyde and a polynuclear polyketone in which the carbon atom of each ketone group is a part of a hydroaromatic ring and is attached to at least one methylene group.

5. A process which comprises reacting with heat treatment formaldehyde and a polynuclear polyketone in which the carbon atom of each ketone group is a part of a hydroaromatic ring and is attached to at least one methylene group.

6. A process according to claim 5 in which the polyketone is a diketone having the ketone groups in the rings of different nuclei.

GEORGE DE WITT GRAVES.